June 9, 1953  H. G. CHATAIN  2,641,363
APPARATUS FOR CLARIFYING LIQUIDS
Filed July 8, 1947  5 Sheets-Sheet 1
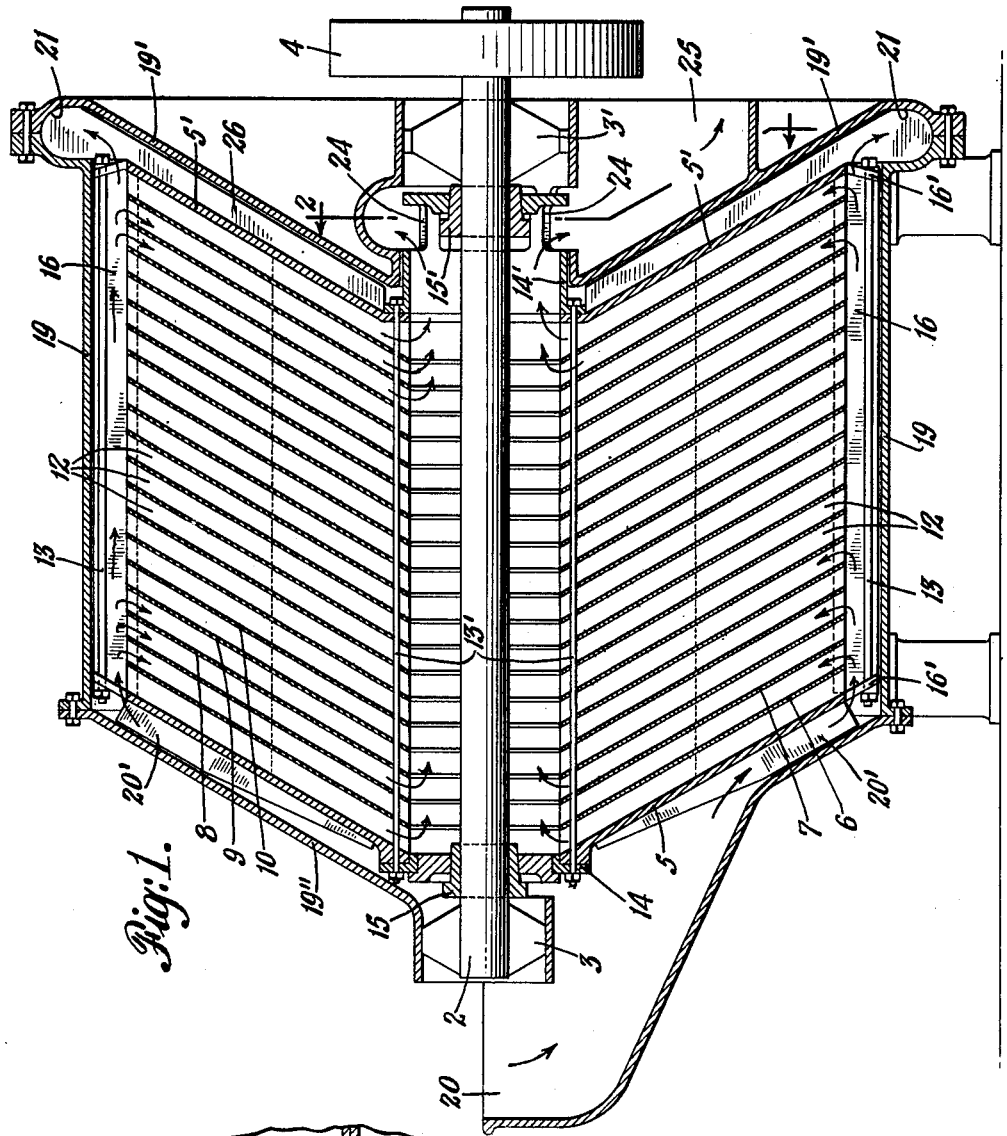
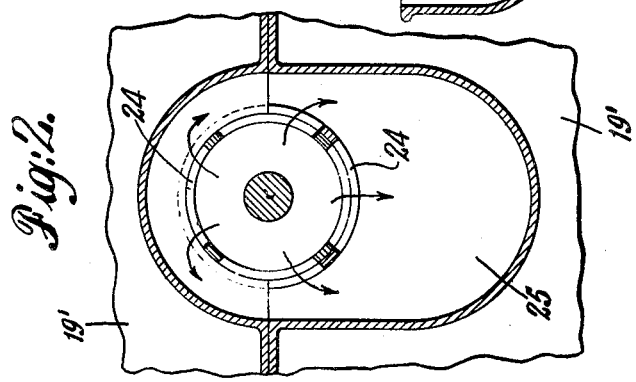
INVENTOR
HENRI G. CHATAIN
BY E. C. Sanborn
ATTORNEY June 9, 1953　　　　　　　H. G. CHATAIN　　　　　2,641,363
APPARATUS FOR CLARIFYING LIQUIDS
Filed July 8, 1947　　　　　　　　　　　　　　5 Sheets-Sheet 2
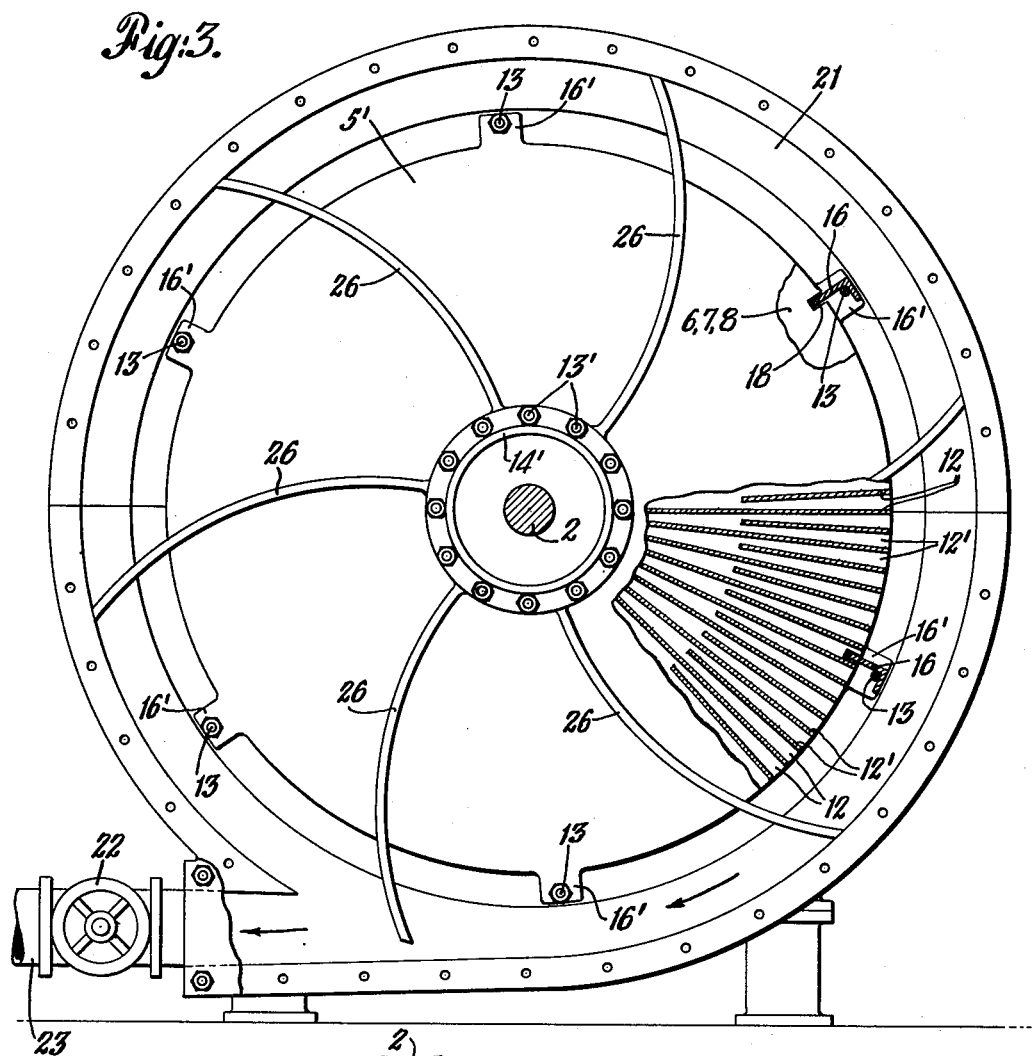
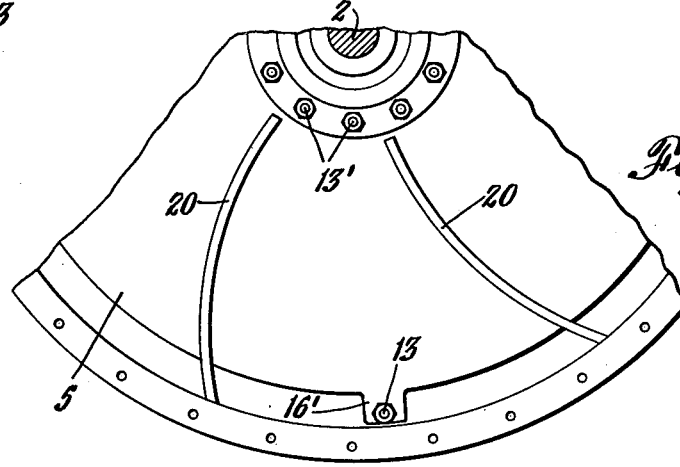
INVENTOR
HENRI G. CHATAIN
BY E. C. Sanborn
ATTORNEY

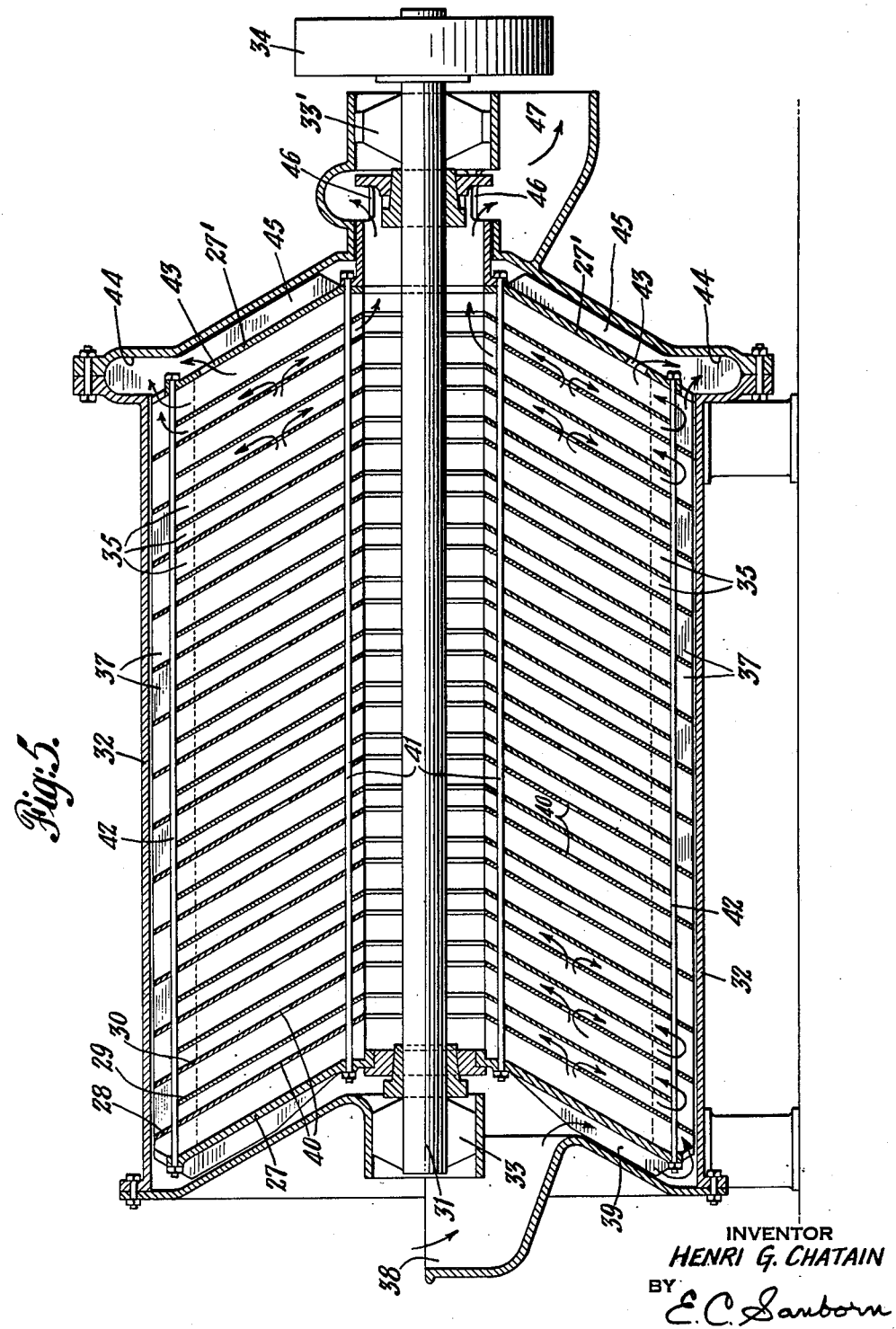

June 9, 1953 H. G. CHATAIN 2,641,363
APPARATUS FOR CLARIFYING LIQUIDS
Filed July 8, 1947 5 Sheets-Sheet 4
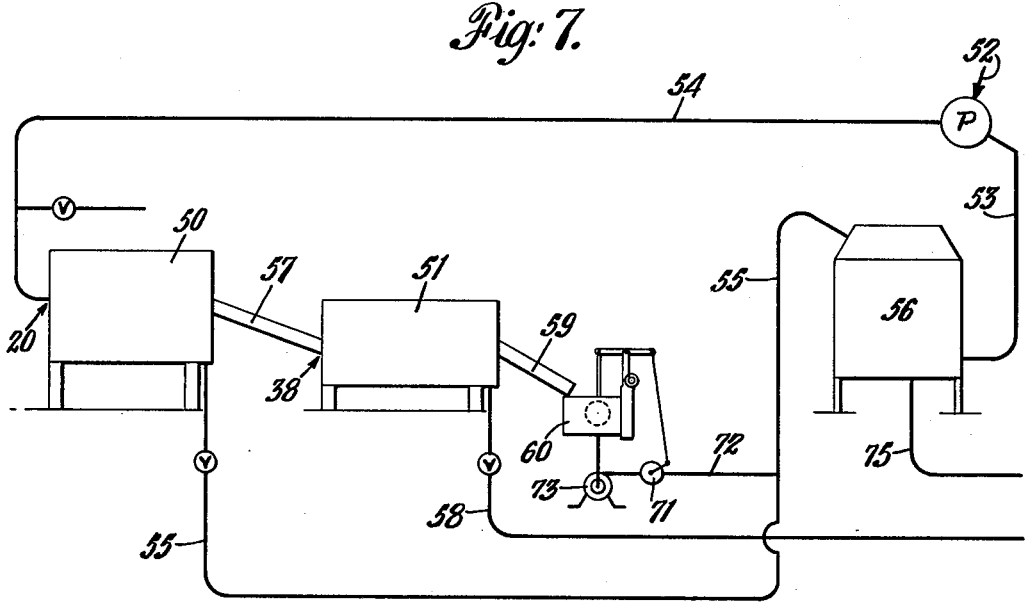
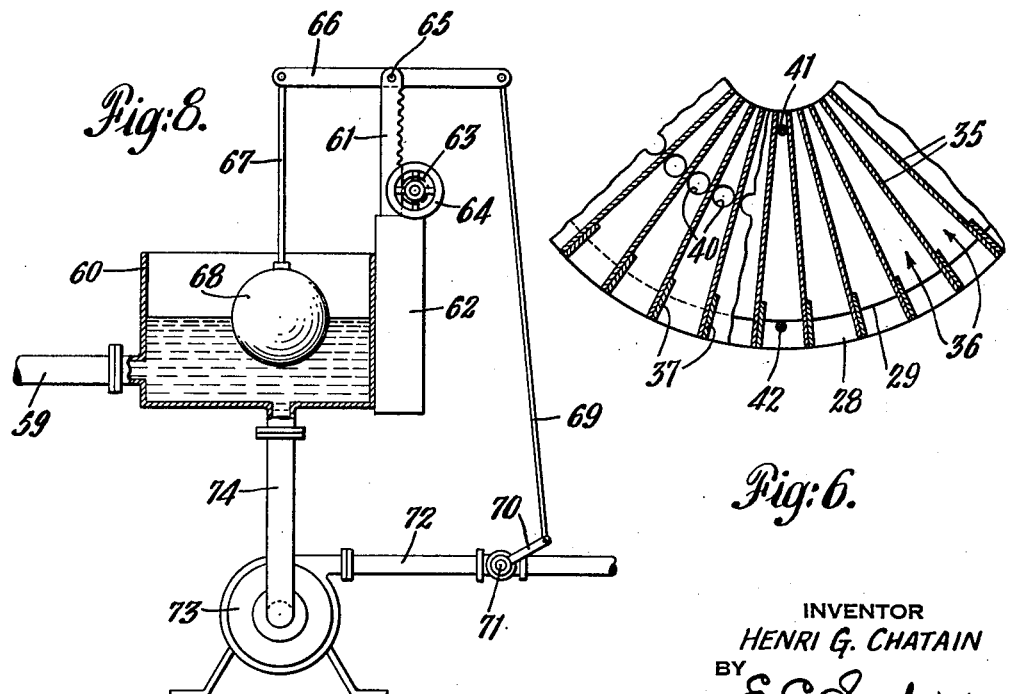
INVENTOR
HENRI G. CHATAIN
BY E. C. Sanborn
ATTORNEY June 9, 1953  H. G. CHATAIN  2,641,363
APPARATUS FOR CLARIFYING LIQUIDS
Filed July 8, 1947  5 Sheets-Sheet 5

INVENTOR
HENRI G. CHATAIN
BY
E. C. Sanborn
ATTORNEY

Patented June 9, 1953

2,641,363

UNITED STATES PATENT OFFICE 2,641,363

APPARATUS FOR CLARIFYING LIQUIDS

Henri G. Chatain, Clearwater, Fla.

Application July 8, 1947, Serial No. 759,615

1 Claim. (Cl. 210—52)

This invention relates to the clarification of liquids and more particularly to the clarification of somewhat less than the entire continuously running mass of liquid and solids in suspension which may issue from a continuous process. The invention provides a method and apparatus for continuously returning rapidly, in the form of fluid streams, both a running mass of liquid containing solids and the clarified portion for their respective purposes to the continuous process. The solids referred to may be widely diversified in character, especially including those of a fibrous nature.

A feature of the invention resides in a novel method and apparatus for effecting the desired separation.

A further feature comprises apparatus for separating heavy solids from a portion of a liquid, and apparatus for receiving the clarified liquid portion and separating therefrom solids lighter than said liquid.

The invention further provides a novel rotatable apparatus for separating a liquid from solids with particular effectiveness.

The invention also comprises as a further feature provisions for obtaining three streams or fractions from a continuously running liquid, one stream containing the heavy solids, another the lighter solids, and a third of desired clarity.

In addition the invention provides effectively for controlling the liquid entering and emerging from the separating or clarifying unit or units.

Further features of the invention will be hereinafter described and claimed.

In the accompanying drawings

Fig. 1 is a longitudinal vertical section of a rotatable separating or clarifying unit.

Fig. 2 is a detailed view in vertical section on line 2—2 of Fig. 1.

Fig. 3 is an end view showing the interior assembly of Fig. 1 as viewed from the right, with the stationary right hand cover plate of Fig. 1 removed, and other parts broken away.

Fig. 4 is a fragmentary view of Fig. 1 as viewed from the left.

Fig. 5 is a longitudinal vertical view of another rotary clarifying unit, adapted to separate a portion of a liquid from solids lighter than the liquid.

Fig. 6 is a fragmentary view in end elevation of one of the cones in Fig. 5, broken away to show the next cone and cooperating passage-forming fins.

Fig. 7 is a diagrammatic view illustrating uses of the invention in the manufacture of sugar.

Fig. 8 is a view partly in vertical section and partly in elevation illustrating mechanism for automatically controlling the flow of liquid from a separating unit.

Figure 9:
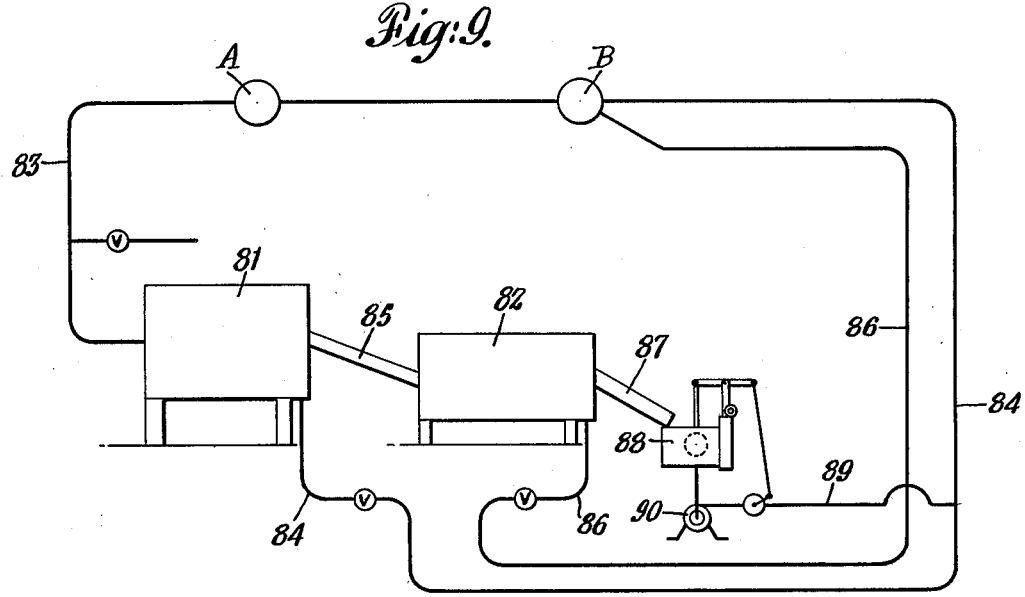
Fig. 9 is a diagrammatic view illustrating the invention as applied to paper manufacture.

Referring to the drawings there is shown in Fig. 1 a shaft 2 rotatably mounted in bearings 3, 3', and adapted to be rotated by suitable power applied to pulley 4 on one end of said shaft. Suitably secured to the shaft for rotation therewith are a cover cone 5 and a base cone 5'. Also secured to said cones for rotation therewith as a unit is a series of thin metal truncated cones 6, 7, 8, 9, 10, etc., spaced longitudinally by fins or metal walls 12 perpendicular to their surfaces and forming passageways as indicated at 12', Fig. 3. The stacks of truncated cones forming a multiplicity of passageways is held together by bolts 13 extending through base and cover cones; and also by bolts 13' passing through all of the cones of the assembly.

The stack of cones is secured to the shaft 2 for rotation therewith in any suitable manner as by means of members 14, 14', secured to the cones as by the bolts 13', and firmly engaged with collars 15, 15' fast on said shaft.

Longitudinal members 16, in the form of angle irons, are secured to the cone assembly in any suitable way, adjacent the bolts 13. Specifically, the bolts 13 are shown passing through lugs 16' projecting from the base and cover cones. The truncated cones 6, 7, 8, 9, 10, etc. are provided with notches 18 aligned with the respective pairs of lugs on the base and cover cones. Each angle iron 16 is fitted into notches 18 between a corresponding pair of lugs 16' and lies adjacent a corresponding bolt 13. The corresponding pair of lugs 16' may be converged slightly toward each other, as shown, and engaged with opposite ends of the associated angle iron 16, for maintaining it firmly in position.

Surrounding the cone assembly is a stationary cylindrical enclosure 19, having fastened thereto at one end a cover plate 19' and at the opposite end a cover plate 19''. The cover plate 19'' is provided at one end with a large funnel shaped opening 20 for receiving a liquid stream from the continuous process. Said stream is supplied continuously to the opening 20 by suitable piping (not shown).

The cover cone 5 is provided on its outer surface with several blades 20' which act during the rotation of the cones to distribute the incoming liquid stream equally around the periphery of said cover cone. As liquid flows continuously into the opening 20 and the cone assembly is continuously rotated, the centrifugal force applied to the liquid by the rotating cones impells the liquid mass radially outward. The liquid is thence made to revolve at the same speed as the rotating cones by the longitudinal vanes 16, as well as by the intervening plates 12 and the friction of the cones themselves.

It will be apparent that during the rotation of the cone assembly in Figs. 1-4 the total incoming liquid mass which is received at 20 will be divided into two streams. One of these streams, containing the solids impelled outwardly by centrifugal force will pass into the chamber 21 provided at the right hand end of the stationary casing (Figs. 1 and 2) and thence out through valve 22 to exit pipe 23. The liquid from which said solids have been extracted by centrifugal force will pass out through the center openings 24 (Figs. 1 and 2) into outlet 25. Any solids contained in this liquid will be lighter than the liquid itself, assuming the rotation of the cone assembly to be at sufficient velocity to force outwardly the solids heavier than the liquid.

More specifically, in the operation of the apparatus shown in Figs. 1-4, the cone assembly rotates inside the stationary cylindrical housing 19 at such speed as to produce the desired centrifugal force. As noted above, the liquid mass entering at 20 is immediately acted upon by the blades 20' of the cover cone, which distributes the liquid uniformly in the apparatus. A large part of the heavy solids are rapidly sent to the outer periphery of the cones, whence they pass along the inner periphery of the cylindrical housing and thence into the chamber 21. The light solids, on the other hand, are displaced toward the center of the cone assembly and thence into outlet 25.

The longitudinal vanes 16 keep clear said inner cylindrical housing surface over which they travel, and increase the slip between the rotating assembly and the stationary housing 19. The cones are preferably equally spaced longitudinally so as to form passageways for the liquid with optimum quiescence. As previously noted, the fins 12 form between each pair of the cones a group of passageways 12' simulating tubes. The rapidity of flow of liquid toward the center of the cone assembly through these tube passageways does not exceed the rapidity with which the heavy particles go to the outside by centrifugal force. As illustrated in Fig. 3, some of the fins 12 may be longer than others, the shorter fins forming subdivisions to obtain desired quiescence.

The cones are at a substantial angle to the vertical with respect to the shaft, to increase the rapidity of sedimentation therein. This permits and encourages the solids to cluster on the surface of each cone in line with the centrifugal force and then slide down said surface more "en masse" rather than as individual particles, presenting a shape which will settle quicker when acted upon by the settling force. Under these conditions the passageway is freer to permit the discharge of clear liquid, and the required length of passageway is less.

From the passageways 12' between the cones the heavy solids are continually being forced to the outside after they have been settled from the inward flow through the cones. There are thus two streams moving as shown by the arrows in Fig. 1; one directed to the center and thence to outlet 25, composed of liquid and light solids (if any), and the other toward the chamber 21 and valve 22, composed of liquid and all the heavy solids.

To assure constant flow and prevent clogging, as when fibrous solids are handled, the base cone 5' is equipped with blades 26 so as to act in a manner similar to a pump. This also maintains a constant head on the liquid passing through valve 22 and the pipe 23. The valve 22 may be opened more or less and a greater or lesser amount of liquid containing the heavy solids may be returned to the process at will. As a greater quantity of liquid passes through valve 22, a corresponding greater quantity is thus returned to opening 20. It may be noted that this provision for varying the output at the discretion of the operator does not influence in any way the quantity leaving at the central outlet 25. Also the quantity leaving the outlet 25 may be lessened but cannot be much increased without interfering with the degree of clarification.

For separating the light solids from the stream emerging from outlet 25, said stream may be passed into the apparatus shown in Fig. 5. This apparatus comprises a base cone 27, cover cone 27', and intermediate thin truncated cones 28, 29, 30, etc., all fastened together and rotated by a shaft 31. These cones are enclosed by a cylindrical casing 32, within which are mounted bearings 33, 33' for the shaft 31. If desired, the shaft 31 may be an extension of the shaft 2 of the apparatus in Fig. 1; or, if desired, shaft 31 may have a pulley 34 secured thereto for receiving power from any suitable source. It will be noted that the cones in Fig. 5 are oppositely inclined with respect to those in Fig. 1, for a purpose which will later appear.

The thin truncated cones 28, 29, 30, etc. have interposed between them fins or metal walls 35 (Fig. 6) perpendicular to their surfaces to form passageways 36 simulating tubes. Also said cones are provided with longitudinal members 37, which are fitted into notches in said cones and extend longitudinally through the entire truncated cone assembly from the inner surface of base cone 27 to the inner surface of cover cone 27'. It will be noted that there are as many longitudinal members 37 as there are fins 35 between adjacent cones, so that said members form the outer end portions of the tubular passageways through which the liquid stream is made to flow between adjacent cones in Fig. 5.

It will be further observed that in Fig. 5 the cones are unequally spaced longitudinally, so as to form passageways alternately unequal between them.

In the operation of the apparatus shown in Fig. 5, the liquid mass enters at 38 and is immediately acted upon by the blades 39 mounted on the cover cone 27, which distributes the liquid mass uniformly in the machine. The aforementioned reverse inclination of the cones in Fig. 5 permits and encourages the light solids to cluster on the cone surfaces. As the liquid moves outwardly by centrifugal force, the lighter solids are displaced upwardly on the cone surfaces towards the center of the assembly. The length of passageways between cones should be sufficient to afford ample time for the displacement of the solids lighter than the liquid from the liquid portions impelled outwardly by centrifugal force.

Alternate cones in Fig. 5 are, as shown, provided with openings 40 intermediate their edges and extend substantially to the inner surface of the housing 32. The intervening cones which do not have openings 40 are of substantially less diameter than the others. Bolts 41 passing through the entire series of cones serve to fasten the assembly together as a unit. Other bolts 42 also assist in uniting the assembly and in clamping the ends of the longitudinal members 37 between the base and cover cones.

In Fig. 5, the arrows show the paths taken by the liquid stream, first inwardly toward openings 40, and then dividing into streams some of which continue toward the center while the others flow outwardly into the region at the inner surface of the housing 32. Thence they flow inwardly again, and so on until the entirely clarified fraction finds its way from the rear portion of said inner housing surface, as well as through openings 43 in base 27', into chamber 44 in said housing. Pump vanes 45 on the base cone 27' act to maintain a constant head on the liquid in chamber 44. Like the chamber 21 in Fig. 1, the chamber 44 in Fig. 5 communicates through a suitable valve with an outlet pipe.

The liquid fraction containing solids lighter than said liquid passes from center of the cone assembly, through openings 46, into outlet chamber 47.

An example of the application of features of the invention to the manufacture of sugar, and particularly in the desired rapid clarification of the sugar juice, is illustrated in Fig. 7. The apparatus of Fig. 1 is there designated by the numeral 50 and the Fig. 5 apparatus by numeral 51. The sugar juice to be clarified is received at station P through line 52. To the same station is returned juice with certain solids by way of line 53. The combined juice to be clarified, and juice with returned solids, is passed through line 54 to the inlet 20 of unit 50. From that unit the portion of the juice containing heavy solids passes through line 55 to a continuous centrifugal separator 56, such as of the basket type, shown in Patent No. 2,292,990. The juice containing light solids emerging from the center of unit 50 passes through pipe 57 to the inlet end 38 of unit 51.

The clarified juice from unit 51 passes through line 58 to the point where it is treated for extraction of the sugar. The juice containing light solids emerging from the center of unit 51 passes through a pipe 59 into a control unit, shown more particularly in Fig. 8, and which may be constructed and arranged as follows:

A small tank 60 communicating with the pipe 59 receives the liquid containing light solids from the center of the unit 51. Adjacent the tank 60 is a rack 61 slideably mounted in a suitable support 62 affixed to said tank. Said rack engages a pinion 63 which may be operated when desired by a hand wheel 64.

Fulcrummed between its ends at point 65 on the upper end of rack 61 is a lever 66, one end of which is connected by rod 67 to a float 68 which rests upon the liquid in the tank 60. The other end of lever 66 is connected by link 69 to arm 70 for operating a valve 71 in the outlet pipe 72 of a centrifugal pump 73. The inlet of said pump is connected through pipe 74 to the tank 60.

It will be apparent that in the above described arrangement a change in level of the liquid in tank 60 will vary the position of the float 68 and hence of the valve 71, thereby controlling the output of the pump 73 to maintain the liquid in tank 60 at a substantially constant level, and thus to maintain a substantially constant rate of flow of liquid through the outlet pipe 72 of said pump.

If it be desired to change the rate of flow of liquid through pipe 72, the operator may turn the hand wheel 64 to shift the rack 61 in the proper direction, thus raising or lowering the fulcrum 65 and shifting the valve 71 to a new setting. If, for example, it is desired to decrease the flow of liquid through pipe 72, the rack 61 and fulcrum 65 are lowered, thus moving the valve 70 toward closed position. This decrease in outflow through pipe 72 will be reflected in a corresponding decrease in the amount of liquid entering and leaving the unit 51, and hence in the amount of liquid entering the tank 60 through pipe 59. Thus the liquid level in tank 60 will be lowered, and float 68 will act to raise the rod 69, turning the valve 71 toward open position and in turn increasing the flow at 59, so that equilibrium will be reached and a new position of valve 71 determined.

The juice passing through pipe 72 in Fig. 7 passes out from said pipe into the pipe 55 which as previously noted contains juice and heavy solids. This mixture of juice containing heavy solids and juice containing light solids proceeds into the separator 56. Solid material of substantial degree of dryness emerges from said separator through outlet 75, while the juice remaining, and containing some solids, passes from separator 56 through pipe 53 to point P above referred to.

There has thus been provided a continuous circuit for the clarification of sugar juice and recovery of solids with efficiency and expedition.

In Fig. 9 the invention is shown applied to paper manufacture. In this figure the unit 81 is the same as that shown in Fig. 1, and the unit 82 is the same as that shown in Fig. 5. Paper from the Fourdrinier wire leaves the Fourdrinier at point or station A, while the paper furnish enters at point or station B. White water containing light and heavy solids passes through the Fourdrinier wire, and thence through pipe 83 to the inlet of unit 81. Water containing heavy solids passes from unit 81 through pipe 84 and is returned to process through said pipe, to point B. Water containing light solids flows from the center of unit 81 through pipe 85 to the inlet of unit 82.

From the outer portion of unit 82 clarified water flows through pipe 86 and is returned to process at point B. Water containing light solids emerges from the center of unit 82 and passes through pipe 87 to control unit 88 which may be the same as that described in connection with Fig. 8. Thence said liquid containing light solids passes through outlet pipe 89 of centrifugal pump 90 and then into pipe 84 for return to process.

Figure 10:
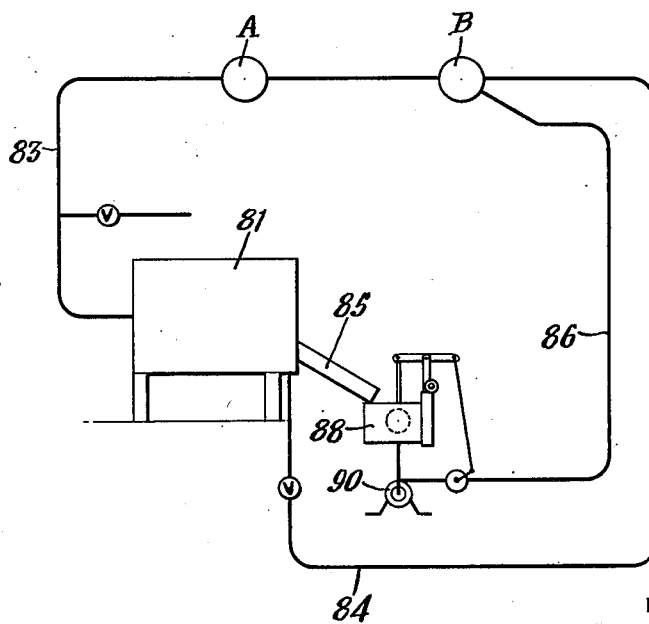
Fig. 10 is a diagrammatic view showing a modification of Fig. 9.

In Fig. 10 the invention is applied to paper manufacture wherein the liquid mass embodies only heavy solids. In this figure the points A and B are the same as those indicated above in Fig. 9. Since the liquid contains only heavy solids, only the unit 81 need be utilized, and the clarified liquid emerging through its pipe 85 passes directly to the control unit 88 for return through pipe 86 to process at point B, said pipe 86 in this instance forming the outlet pipe of the centrifugal pump 90. Pipe 84 containing liquid and heavy solids communicates with point B as in Fig. 9.

It will of course be understood that if the liquid from the Fourdrinier embodies only solids lighter than water, the unit 82 of Fig. 9 may be used by itself and unit 81 omitted.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

Apparatus for treating a liquid stream containing fibrous solids, said apparatus comprising a stationary housing having an inlet for receipt of said stream, and a centrifugal unit comprising a plurality of rotary zone-defining members extending between the axis of rotation of said unit and its outer periphery, each of said zones being subdivided into a plurality of smooth rectangular tubular passages inclined at substantial angles to the radial lines of centrifugal force for intercepting solids impelled toward said periphery by said force and enabling said solids to slide along the smooth surface of said paths and to transiently accumulate thereon and return to the liquid at said outer periphery, each of said rectangular tubular passages being unobstructed at its ends and throughout its length to enable free travel of said solids to said periphery and of clarified water to a region adjacent said axis of rotation, said unit also having vanes at its end opposite said inlet for directing solid matter to an outlet in the adjacent peripheral portion of said housing during rotation of said unit, means for withdrawing liquid and solids from said outlet, and means for withdrawing clarified liquid from a region adjacent the axis of rotation of said centrifugal unit.

HENRI G. CHATAIN.

References Cited in the file of this patent

UNITED STATES PATENTS

| Number | Name | Date |
|---|---|---|
| 902,913 | Risberg | Nov. 3, 1908 |
| 1,212,168 | Anker-Holth | Jan. 16, 1917 |
| 1,412,738 | Heller | Apr. 11, 1922 |
| 1,664,769 | Chance | Apr. 3, 1928 |
| 1,721,230 | Molbach | July 16, 1929 |
| 1,751,689 | Enz et al. | Mar. 25, 1930 |
| 1,754,774 | Sharples | Apr. 15, 1930 |
| 1,873,598 | Jones | Aug. 23, 1932 |
| 1,908,691 | Coe | Mar. 16, 1933 |
| 2,313,540 | Hall | Mar. 9, 1943 |
| 2,416,009 | Ketchum | Feb. 10, 1947 |

FOREIGN PATENTS

| Number | Country | Date |
|---|---|---|
| 2,837 | Great Britain | of 1889 |
| 251,260 | Germany | Sept. 28, 1912 |
| 305,844 | Germany | Mar. 25, 1918 |
| 620,601 | France | Apr. 26, 1927 |
| 81,222 | Sweden | Aug. 14, 1934 |